US008676255B2

(12) United States Patent
Moelker et al.

(10) Patent No.: US 8,676,255 B2
(45) Date of Patent: Mar. 18, 2014

(54) INTEGRATED CIRCUIT SYSTEM

(75) Inventors: Dignus-Jan Moelker, Voorhout (NL);
Robert Niels Schutten, Assendelft (NL);
Juki Wirawan Tantra, Singapore (SG)

(73) Assignee: Dunti LLC, Austin, TX (US)

(*) Notice: Subject to any disclaimer, the term of this patent is extended or adjusted under 35 U.S.C. 154(b) by 176 days.

(21) Appl. No.: 13/270,637

(22) Filed: Oct. 11, 2011

(65) Prior Publication Data

US 2012/0094621 A1 Apr. 19, 2012

(30) Foreign Application Priority Data

Oct. 11, 2010 (EP) ...................................... 10187165

(51) Int. Cl.
*H04M 1/00* (2006.01)
(52) U.S. Cl.
USPC ........................ 455/553.1; 455/84; 455/552.1
(58) Field of Classification Search
USPC ................... 455/84, 73, 552.1, 553.1; 725/25
See application file for complete search history.

(56) References Cited

U.S. PATENT DOCUMENTS

| 6,195,563 | B1 * | 2/2001 | Samuels ......................... 455/84 |
| 6,393,299 | B1 * | 5/2002 | Mizumoto et al. ......... 455/552.1 |
| 6,526,264 | B2 * | 2/2003 | Sugar et al. ...................... 455/84 |
| 7,561,852 | B2 * | 7/2009 | Darabi et al. .................... 455/73 |
| 7,715,869 | B2 * | 5/2010 | Takahashi et al. ......... 455/552.1 |
| 2003/0139147 | A1 | 7/2003 | Shi |
| 2003/0193923 | A1 * | 10/2003 | Abdelgany et al. ........... 370/342 |
| 2005/0097595 | A1 * | 5/2005 | Lipsanen et al. ................ 725/25 |
| 2010/0091688 | A1 | 4/2010 | Staszewski et al. |
| 2011/0013677 | A1 * | 1/2011 | Ibrahim et al. ................ 375/219 |

FOREIGN PATENT DOCUMENTS

WO 01/24454 4/2001

* cited by examiner

*Primary Examiner* — Lewis West
(74) *Attorney, Agent, or Firm* — Kevin L. Daffer; Daffer McDaniel LLP

(57) ABSTRACT

An integrated circuit system is provided for wireless data communication, comprising a set of hardware components and a port for connection to an RF antenna or an RF Front-End-Module, wherein at least a subset of hardware components is arranged for being shared for simultaneous wireless data communication based on a first protocol and a second protocol. Preferably, the first protocol includes a Wi-Fi standard and the second protocol includes a dedicated protocol for wireless audio communication.

13 Claims, 5 Drawing Sheets

INTEGRATED CIRCUIT SYSTEM

PRIORITY CLAIM

This application claims priority to pending European Application No. 10187165.5 filed on Oct. 11, 2010.

BACKGROUND OF THE INVENTION

1. Field of the Invention

The invention relates to an integrated circuit system for wireless data communication based on a first protocol, comprising a set of hardware components and a port for connection to an RF antenna or an RF Front-End-Module.

2. Description of Relevant Art

Various chip sets are known for executing a protocol for general wireless data communication such as IEEE 802.11, also referred to as Wi-Fi, and Bluetooth. Also chip sets are known for implementing dedicated protocols for wireless data communication, such as audio data.

In a typical application, content can be transferred from the Internet to a TV device using a general wireless data communication protocol, e.g., Wi-Fi. When the application includes separate audio devices, such as loudspeakers or ear phones, an additional chip set can be used for transferring high quality audio to the audio devices. However, when using a multiple number of chip sets, the cost price and form factor of the application increases.

SUMMARY OF THE INVENTION

The following description of various embodiments of an integrated circuit system is not to be construed in any way as limiting the subject matter of the appended claims.

One objective of the present invention is to provide an integrated circuit system, wherein the disadvantages identified above are reduced. To obtain such an objective, an integrated circuit system is provided that efficiently processes a first protocol and a second protocol for wireless data communication. According to one embodiment, the integrated circuit system comprises at least a subset of hardware components arranged for being shared for simultaneous wireless data communication based on the first protocol and the second protocol.

In principle, the shared hardware components may include any digital, analog and/or mixed signal module that is part of the integrated circuit system. As an example, the shared hardware components may include a radio frequency (RF) chain, an analog to digital converter (ADC), a digital to analog converter (DAC), a memory component, a general purpose processor, a baseband processor, and/or an input/output (I/O) component.

By sharing hardware components for simultaneous wireless data communication, a synergetic advantage can be obtained, thus avoiding the implementation of additional components. In specific implementations, the use of an additional integrated circuit is superfluous, thereby further reducing the cost price and form factor of the entire system.

It is noted that the term "simultaneous" means in this context that the first protocol and the second protocol run simultaneously. As an example, a WiFi based protocol is transferring data, while a wireless audio data communication protocol is playing audio. The shared hardware components are typically used in a time-shared way, wherein the shared components switch rapidly between operation for the first protocol and the second protocol, respectively. Then, the time period in which a shared component serves a single protocol is relatively short.

The embodiments described herein are at least partly based on the insight that due to protocol characters, the first and second protocols can operate using similar hardware components in common. This is especially the case when the second protocol is also used for wireless data transmission.

In a preferred embodiment, the subset of shared hardware components includes embedded components, such as at least one processor, at least one Digital Rights Management (DRM) engine and/or at least one I/O component, thereby exploiting the fact that the protocols share at least some functionality.

In a further embodiment, the subset of shared hardware components includes at least a radio module chain in a receiver and/or transmitter configuration, thereby exploiting the common characteristic in the protocols of modulating and transmitting the signals similarly.

The synergy in the protocols can be further exploited by sharing also an entire receiver and/or transmitter configuration and/or a common processor for executing at least a part of the first protocol and at least a part of the second protocol.

Other advantageous embodiments according to the invention are described in the following claims.

BRIEF DESCRIPTION OF THE DRAWINGS

In the following, the invention will be described by way of example, without limitation of the general inventive concept, on examples of embodiment and with reference to the drawings.

Figure 1:
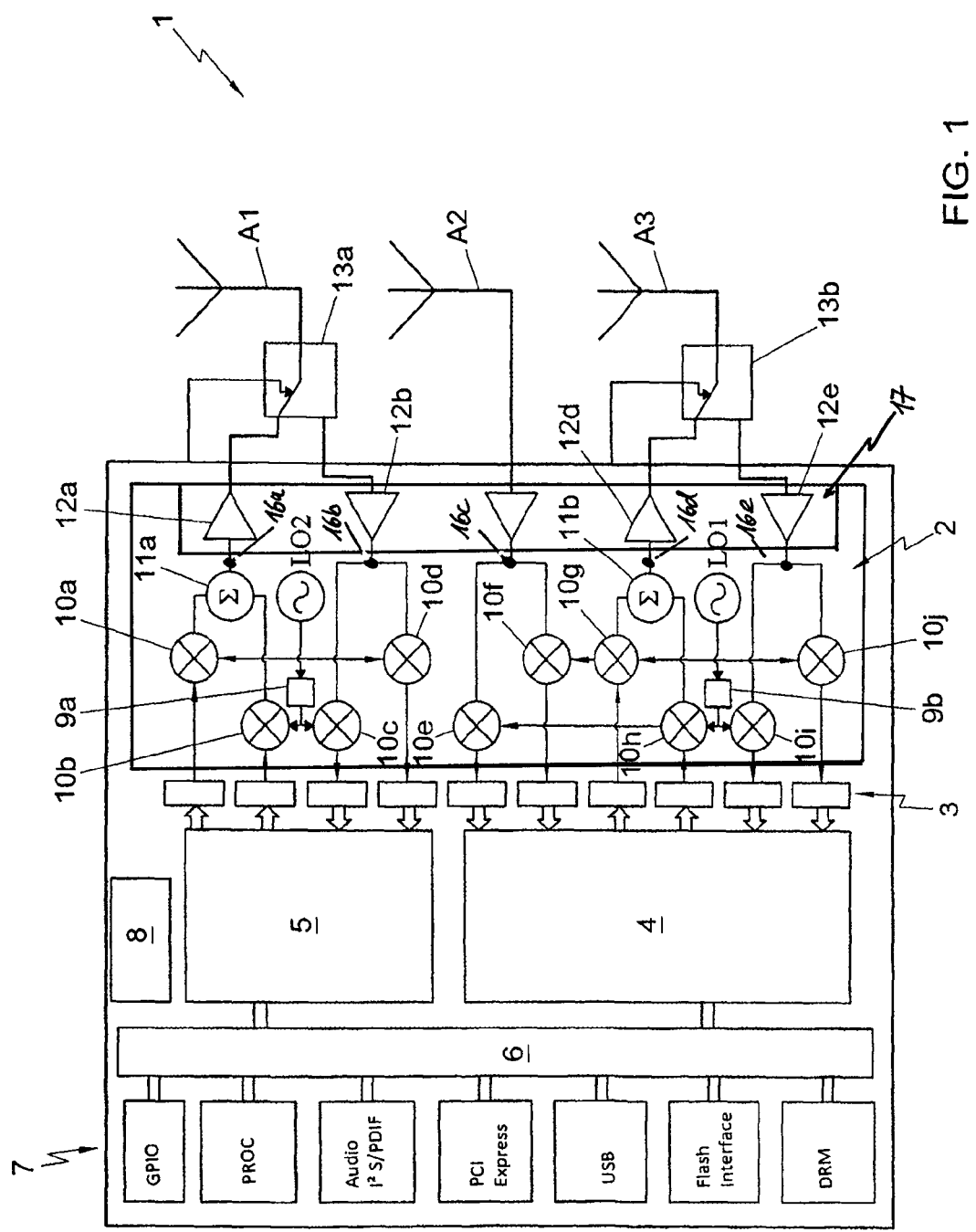
FIG. 1 shows a first embodiment of an integrated circuit system according to the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 shows a first embodiment of an integrated circuit system 1. The first embodiment of the integrated circuit system 1, also called a "parallel embodiment," includes a set of hardware components for performing wireless data communication based on a first protocol, e.g. a Wi-Fi standard. More specifically, the hardware components include a receiver and/ or transmitter configuration, comprising a radio module chain 2 for transmitting and receiving RF signals via a multiple number of RF antennas A1-A3, which are externally connectable to the integrated circuit system 1 via corresponding ports. The receiver and/or transmitter configuration includes a plurality of ports 16a-16e for connection to the RF antennas A1-A3 and/or to RF Front-End-Modules (FEM) 17. The receiver and/or transmitter configuration also includes analog-to-digital converters and digital-to-analog converters 3 (e.g., an RX I-ADC, RX Q-ADC, TX I-ADC, and TX Q-ADC) for interfacing between the analog and digital signal portions of the circuit or chip 1. In addition, the hardware components of the integrated circuit system 1 include a first protocol module 4 for performing a first protocol (e.g., IEEE 802.11.n), and a second protocol module 5 for performing a second protocol.

According to one embodiment, the first protocol module 4 may include a first dedicated hardware component for executing at least a part of the first protocol. Similarly, the second protocol module 5 may include a second dedicated hardware component for executing at least a part of the second protocol. The first and second dedicated hardware components may, e.g., include a digital signal processor (DSP) or other hardware component. During operation of the integrated circuit system 1, the first protocol can be at least partly executed on the first dedicated hardware component and at least partly executed on a common processor (PROC, FIG. 1). Also, the second protocol can be at least partly executed on the second dedicated hardware component, and at least partly executed on the common processor. Thus, the first and second protocols may be executed partly in hardware, and partly in software. In this embodiment, the common processor (PROC) may be loaded with software for executing at least a part of the first protocol and at least a part of the second protocol. However, at least one protocol can be entirely implemented in either software or hardware, in other embodiments of the invention.

In the embodiment illustrated in FIG. 1, the first and second protocol modules 4, 5 are connected to a common system bus 6 that is linked to a multiple number of embedded components 7. In the illustrated embodiment, the embedded components 7 include a general purpose I/O (GPIO), a common processor (PROC), an encoding module (such as a digital rights management DRM module using, e.g., an AES/RSA encryption algorithm for high-definition digital copy protection, HDCP 2.0), and a multiple number of I/O components. The processor (PROC) can be implemented as a custom DSP or as another processor type, such as an ARM processor. According to one embodiment, the I/O components may include, e.g., a general purpose I/O (GPIO) module; an audio signal module, such as an Audio I2S S/PDIF; a PCI module, such as PCI Express, an USB module and a flash module, such as a Flash Interface. However, a skilled artisan would readily recognize that the I/O components may include more than, less than or alternative I/O modules, other than those shown in FIG. 1. In addition to the components mentioned above, the hardware components on the integrated circuit system 1 may include a power management system 8.

According to one embodiment, the radio module chain 2 may include a first oscillator LO1, a second oscillator LO2, a first phase shift circuit 9a, a second phase shift circuit 9b, a multiple number of mixers 10a-10j, a first adder 11a, a second adder 11b, and a multiple number of buffers 12a-12e. As shown in FIG. 1, the buffers 12a-12e are mutually connected in the RF Front-End-Modules 17, so as to form the radio module chain 2 as a multiple input multiple output (MIMO) radio structure, which in one embodiment, may be a 2TX3RX MIMO structure. Each of the RF antennas A1-A3 is connected to a corresponding radio module in the radio module chain 2, wherein each radio module includes mixers, at least one oscillator, at least one adder and at least one buffer. For example, and as shown in FIG. 1, RF antenna A1 is connected to a radio module including mixers 10a-10d, oscillator LO2, adder 11a, phase shift circuit 9a and buffers 12a, 12b. Two of the RF antennas (A1, A3) can be switched between a receiving state and a transmitting state, using switches 13a, 13b. RF antenna A2 is configured only for the receiving state. Thus, the MIMO structure shown in FIG. 1 includes 3 receivers and 2 transmitters.

It is noted that the radio module chain 2 shown in FIG. 1 can be alternatively implemented using another MIMO radio structure, e.g. including 4 receivers and 3 transmitters. In one embodiment, the MIMO radio structure shown in FIG. 1 is of the quadrature amplitude modulation (QAM) type including I, Q signals. Alternatively, another modulation type can be applied, e.g. PSK, FSK, FM or AM modulation.

The radio module chain 2 includes two branches that are separated so as to communicate, via corresponding ADC/DAC 3, to the corresponding first and second protocol module 4, 5. In the embodiment shown in FIG. 1, a first radio module connected between RF antenna A2 and a second radio module connected between RF antenna A3 and ADC/DAC 3 communicates with the first protocol module 4 over a first branch, while a third radio module connected between RF antenna A1 and ADC/DAC 3 communicates with the second protocol module 5 over a second branch.

According to one embodiment, at least a subset of the hardware components shown in FIG. 1 is arranged for being shared for wireless data communication based on the second protocol. The shared hardware components are shared for simultaneous wireless data communication based on the first protocol and the second protocol. Then, the shared hardware components are used for both the first protocol and the second protocol, so that both protocols can operate simultaneously. The shared hardware components are typically time-shared. In one example, the second protocol may be a dedicated protocol for wireless audio communication. It is noted, however, that instead of a dedicated protocol for wireless audio communication, the second protocol might include a protocol for wireless data communication.

In the parallel embodiment shown in FIG. 1, the subset of shared hardware components includes the common system bus 6 and the embedded components 7. The integrated circuit system 1 includes a hardware component, e.g., the processor (PROC) that is adapted to assign any of the shared hardware components to the first or second protocol. More specifically, the common processor (PROC) can be arranged for executing at least a part of the first protocol and at least a part of the second protocol. It is noted that in another embodiment the process of assigning the shared hardware components is not executed by the processor (PROC), but externally, e.g. by a processor on a separate chip of the integrated circuit system 1 or by a processor on a separate chip system generating signals that are input to the integrated circuit system 1.

Regarding the radio module chain 2, it is noted that if the first oscillator LO1 and the second oscillator LO2 are driven at substantially the same frequency, the first protocol module 4 and the second protocol module 5 are arranged to schedule a time sharing scheme to avoid conflicts that may arise in the transmission medium due to simultaneous transmission. Any communication for exchanging information between the first protocol and the second protocol can, e.g., be performed via the system bus 6. Sharing interfaces are common technology. As an example, the interface 802.15.2 specifies such an interface. As a further example, a Bluetooth-Wi-Fi combination can be implemented using a so-called 3-wire interface. Alternatively, the first and second oscillators LO1 and LO2 can operate at different frequencies in distinct radio channels to avoid garbling transmission data. It is noted that also in the case of distinct applied frequencies, a time scheduling algorithm can be applied to further avoid disturbance of signals.

As an example, the first and second protocols can be implemented in RF bands at 2.4 GHz, 5.2 GHz or 5.8 GHz. However, other RF bands can be applied, e.g. depending on regional restrictions.

The integrated circuit system 1 as shown in FIG. 1 can therefore typically be used as a chipset offering hybrid wireless data communication based on a first protocol and on a second protocol, e.g. for general wireless data communication and dedicated wireless audio communication.

Figure 2:
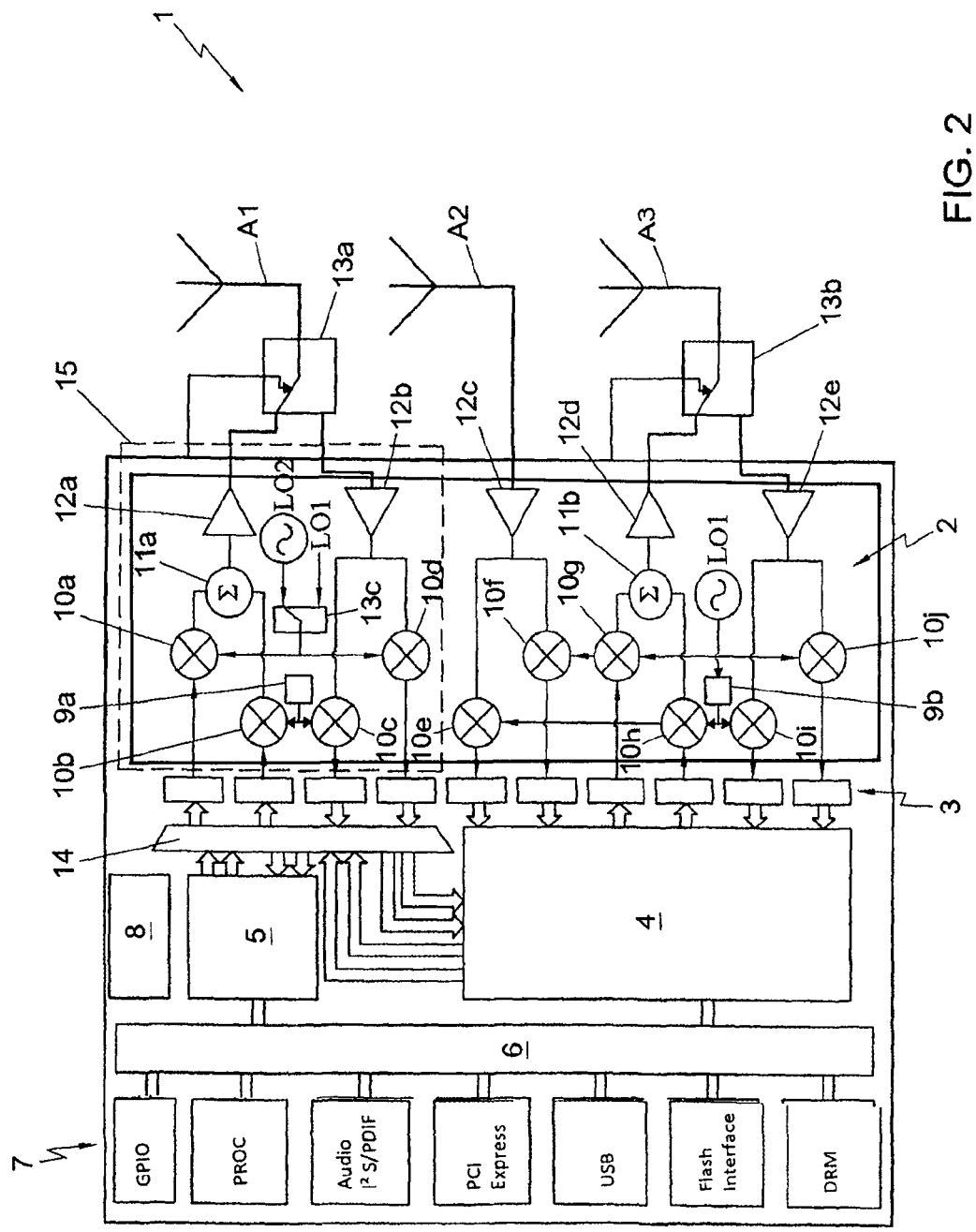
FIG. 2 shows a second embodiment of an integrated circuit system according to the invention.

FIG. 2 shows a second embodiment of an integrated circuit system 1 according to the invention. Here, the subset of shared hardware components includes at least a radio module 15 in the receiver and/or transmitter configuration. In the illustrated embodiment, the radio module 15 connected to the upper antenna A1 is shared by the first protocol module 4 and the second protocol module 5. Accordingly, the integrated circuit system 1 includes an additional interface 14 for exchanging information signals between the shared ADC/DAC 3 coupled to the radio module 15 and the protocol modules 4, 5.

Similar to the embodiment shown in FIG. 1, the first and second protocols can be at least partly run on hardware components in the first and second protocol module 4, 5, respectively. Again, if the shared radio module 15 operates on the same frequency as the frequency of the first oscillator LO1, a time sharing scheme may be scheduled to avoid conflicts that arise in the transmission medium due to simultaneous transmission. Also, if the shared radio module 15 and the first oscillator LO1 operate at mutually different frequencies, a time sharing schedule can be applied to avoid signal disturbance.

When using a time sharing schedule, information can be exchanged between the first and the second protocols about the operating frequency. In a particular embodiment, the first protocol informs the second protocol so that the latter can adapt its operating frequency. Adapting the operating frequency is preferably accomplished seamlessly, using a seamless switching algorithm, e.g., as described below. As an alternative or in addition to exchanging information between the first and the second protocols, at least one channel that is actually used by the first and/or second protocols can actively be scanned.

During operation of the integrated circuit system 1, the shared radio module 15 can dynamically be used by the second protocol module 5, e.g., depending on instantaneous needs of the first protocol module 4. As an example, when the first protocol module 4 is active in a Wi-Fi a/b/g mode, not 802.11n, the shared radio module 15 is not employed by the first protocol module 4, and, thus, can be used by the second protocol module 5. As a further, more sophisticated embodiment, the shared radio module 15 can be used by the second protocol module 5 during time periods when the first protocol module 4 is idle.

As shown in FIG. 2, the radio module chain 2 also includes an additional switch module 13c to switch between an output signal of either the first oscillator LO1 or the second oscillator LO2.

Figure 3:
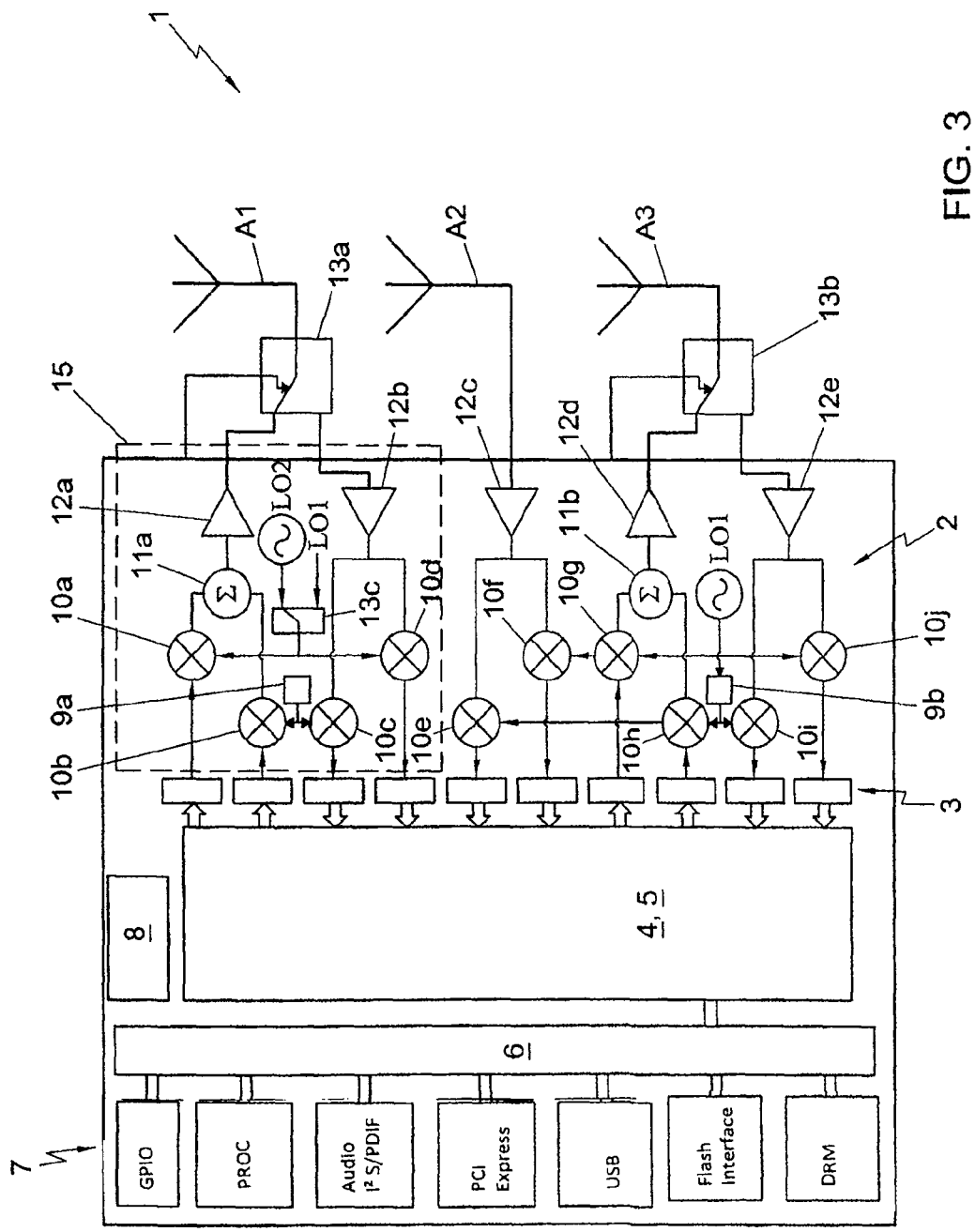
FIG. 3 shows a third embodiment of an integrated circuit system according to the invention.

FIG. 3 shows a third embodiment of an integrated circuit system 1 according to the invention. Here, the subset of shared hardware components includes the entire radio module chain 2 and the corresponding ADC/DAC 3. Further, the subset of shared hardware components now includes the processor (PROC) and a common hardware component in the protocol modules 4, 5 for executing both the first protocol and the second protocol. As an example, the PHY part of the first protocol (e.g. the Wi-Fi protocol) can be executed by a hardware component in the first protocol module 4, while the MAC part of the first protocol is executed by software on the processor (PROC). In principle, the second protocol can be entirely executed by software on the processor (PROC). Again, the first protocol and the second protocol are executed mutually independently, though using shared hardware components. Specifically, the first and second protocols receive and transmit in turn. In a preferred embodiment, the upper radio module 15, connected to the upper antenna A1, can be used on demand by the second protocol, and the other two radio modules can be used by the first protocol forming a 1×2 MIMO structure.

Similar to the configuration shown in FIG. 2, the upper shared radio module 15 can dynamically be used by the second protocol module 5, e.g., depending on instantaneous needs of the first protocol module 4. As a further, more sophisticated embodiment, the shared radio module 15 can be used by the second protocol module 5 during time periods when the first protocol module 4 is idle.

Figure 4:
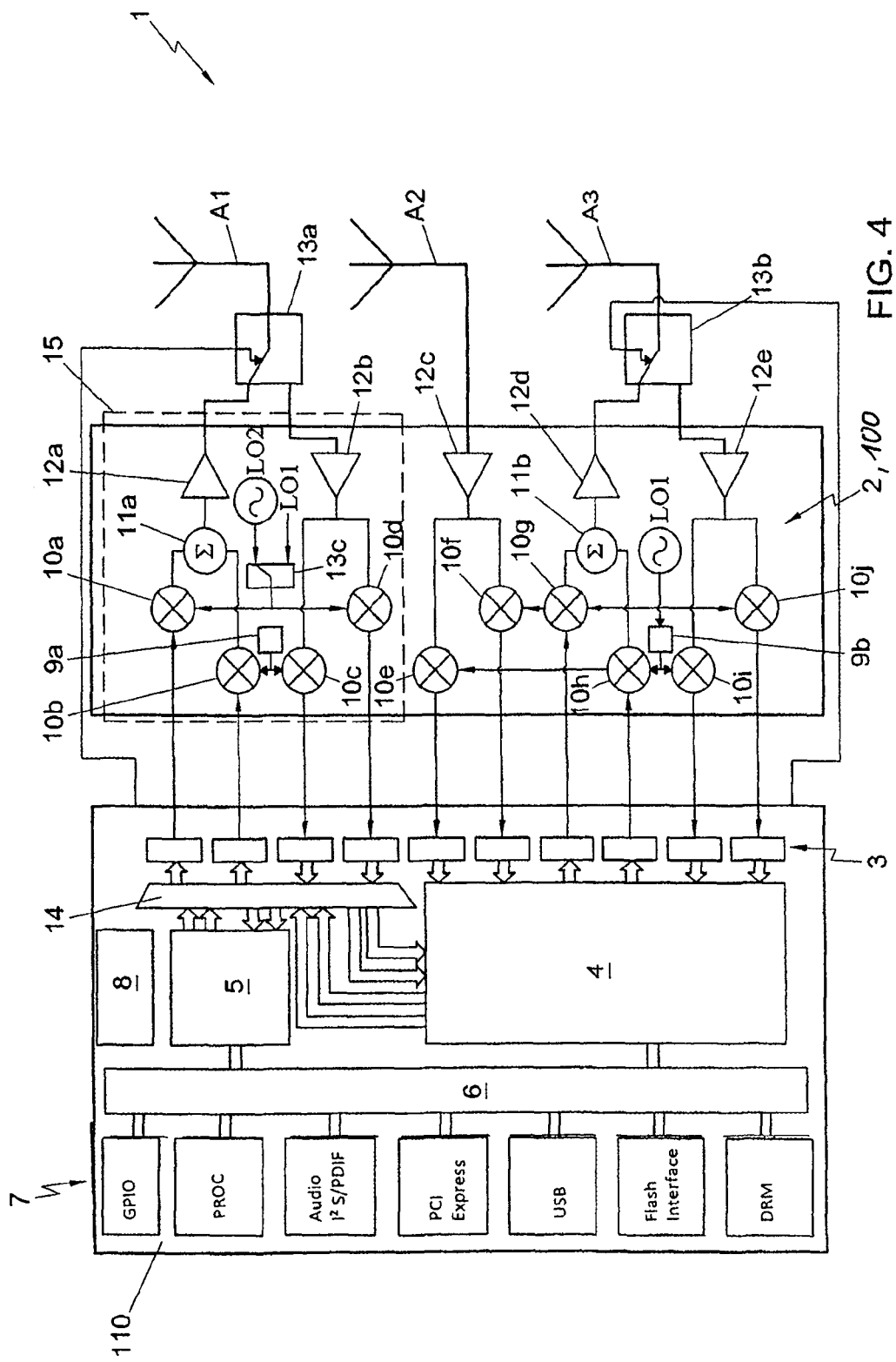
FIG. 4 shows a fourth embodiment of an integrated circuit system according to the invention.

FIG. 4 shows a fourth embodiment of an integrated circuit system 1 according to the invention. Here, the configuration is similar to the second embodiment shown in FIG. 2. Unlike FIG. 2, however, the receiver and/or transmitter configuration 2 are implemented on a first chip 100, while the first and second protocol modules 4, 5, the system bus 6 and the multiple number of embedded components 7 are implemented on a second chip 110.

The invention is not restricted to the embodiments described herein. It will be understood that many variants are possible. It is noted that the first protocol can include a standard Wi-Fi protocol or another protocol for wireless communication, such as Bluetooth. Further, one of the oscillators can be replaced by an oscillator generating a desired frequency difference with the operating frequency of the non-replaced oscillator. In addition, other components can in principle be shared, such as amplifiers or filters that are active in a frequency region including the RF bands of both oscillators. Also, in principle, antenna selection diversity can be applied in the second protocol module.

It is further noted that the integrated circuit system may include other components not specifically mentioned herein, such as memories, clocks, power supply, low dropout regulators (LDOs), external host controllers, etc. Such other components can also be shared by the protocols. In this respect, it is also noted that the integrated circuit system described herein can be supplied with components supporting further protocols, such as Wi-Fi, Bluetooth, Near-Field communication, GPS, FM radio, etc. At least a part of the further protocols can be shared with the first and/or the second protocol.

The integrated circuit system described herein may include a single chip or a multiple number of chips. As an example, the system may include a first chip provided with a first processor and a second chip provided with a second processor, such that both the first processor and the second processor execute a part of a protocol. As another example, shown in FIG. 4, the receiver and/or transmitter configuration 2, optionally including the DAC's and ADC's, can be implemented on a first chip, while the first and second protocol modules 4, 5, the system bus 6 and the multiple number of embedded components 7 are implemented on a second chip.

The shared component(s) can be located on a single chip or on a multiple number of chips of the integrated circuit system.

According to an embodiment, there is also provided a method of operating a network system having a multiple number of network nodes that are arranged for operating in a multiple number of channels, the method can include the steps of: scheduling time slots for transmission of data or control information on a transmission channel in use by the system; scheduling time slots for scanning at least one transmission channel; and wherein the scheduling steps are based on an amount of data and control information to be transmitted, and on an occupancy degree of the transmission channel in use by the system.

Figure 5:
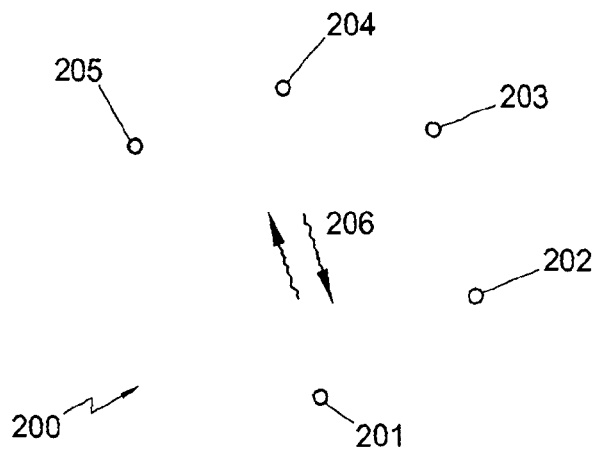
FIG. 5 shows a network system according to one embodiment of the invention.

FIG. 5 shows one embodiment of a network system 200 having a multiple number of network nodes 201-205 that are interconnected using wireless signals 206. In the illustrated embodiment, the network system is based on wireless transmission. However, in principle, the network system could also be wired. One embodiment of a method of operating a network system, such as the network system 200 shown in FIG. 5, is illustrated in FIG. 6.

Figure 6:
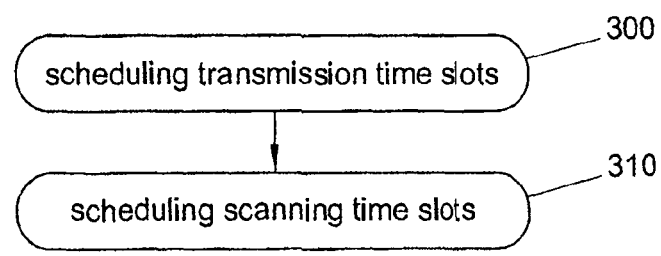
FIG. 6 shows a flow chart of a method of operating a network system according to one embodiment of the invention.

FIG. 6 shows a flow chart of a method of operating a network system 200 having a multiple number of network nodes that are arranged for operating in a multiple number of channels according to an aspect of an an embodiment. The method shown in FIG. 6 includes the step of scheduling time slots (300) for transmission of data or control information on a transmission channel in use by the system, and scheduling time slots for scanning at least one transmission channel (310), wherein the scheduling steps are based on an amount of data and control information to be transmitted, and on an occupancy degree of the transmission channel in use by the system.

The at least one transmission channel to be scanned can be the channel that is in use by the system and/or another channel. The scanning operation is performed in order to briefly check an occupancy degree of the transmission channel. Data, or user data, can be any content, e.g., computer data, audio data, video data, etc. Control information does not include user data, but addresses one or more transmission characteristics, including beacons, probe requests, request-to-send/clear-to-send, etc, as well as human interaction data, meta data, link management data, including data for pairing and/or association.

Regarding the step of scheduling time slots, it is noted that in low latency quality of service (QoS) applications, retransmissions on audio or video streaming are most important for maintaining an uninterrupted low latency link. In the case where slots are used for multiple functions, these retransmissions may have the highest priority. Control information typically is of a lower priority, and therefore, is serviced only when retransmissions on latency-constrained streams are unnecessary. Lastly, sniffing has the lowest priority, as the required response time is lowest. As such, priorities may be different.

It is further noted that the technique of scanning a transmission channel (also called "sniffing") is known and described, e.g., in the International patent publication WO 2007/122188, which is assigned to the applicant. During a scheduled time slot for scanning, the method described herein may further include the steps of: reprogramming at least one network node to receive signals in the at least one transmission channel that is not in use by the system, scanning the at least one transmission channel, and reprogramming at least one network node to the transmission channel that is in use by the system. It is noted that a single transmission channel can be scanned, however, also a multiple number of transmission channels can be scanned during a scheduled time slot for scanning. Further, a multiple number of transmission channels can in principle be scanned simultaneously by a multiple number of network nodes, especially in the case wherein the system uses multiple channels for transmitting data.

The time slot for scanning can be scheduled on a real time basis or on a pre-determined basis. Further, time slots can be scheduled for retransmission of data or control information or for other activities, such as turning off for power save.

After performing the scanning operation, occupancy information of the at least one transmission channel can be collected for deciding whether a transmission channel switch will be done, and if so, at which time instant and to which channel the switch will be made.

It is noted that a channel can be formed by a transmission/receiving frequency or a frequency band.

According to an aspect of the invention, a switch from a first transmission channel to a second transmission channel can be performed by executing the steps of: transmitting on the channel that is in use, via a slave node, control information including a counter and an indication of the new operating channel, wherein the counter represents a time instant on which the switch will take place; reprogramming all network nodes to the new operating channel when the counter reaches a predetermined value; and continuing operating of the system on the new operating channel.

Figure 7:
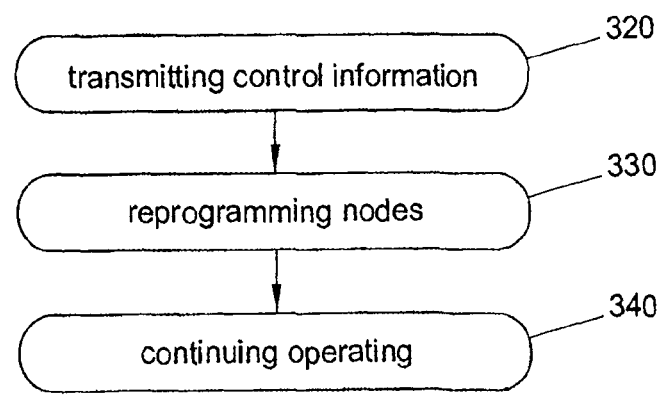
FIG. 7 shows a flow chart of a method of performing a channel switch according to one embodiment of the invention.

For example, FIG. 7 shows a flow chart diagram of a method of performing a channel switch from a first transmission channel to a second transmission channel during operation of a network system 200 having a multiple number of network nodes that are arranged for operating in a multiple number of channels according to an embodiment. As shown in FIG. 7, the method includes the step of transmitting (320) on the channel that is in use, via a slave node, control information including a counter and an indication of the new operating channel, the counter representing a time instant on which the switch will take place, the step of reprogramming (330) all network nodes to the new operating channel when the counter reaches a predetermined value, and the step of continuing operating (340) of the system on the new operating channel.

Here, the switching operation is initiated by a slave node in a master-slave network system. The counter and the indication of the new operating channel can be placed in the packet header of any packet in the transmission sequence.

By performing the channel switch according to an embodiment, a seamless switch can be made wherein the system changes an operating frequency or frequency band without substantially interrupting a service delivered by the system. Switching a frequency band is applicable in case of systems using dual or triple band radio's, particularly when these systems operate in crowded bands, such as the 2.4 GHz (2400-2483.5 MHz) and 5.8 Ghz (5725-5875 MHz) ISM bands. Optionally, an offset compensation per RF frequency can be made, e.g., by means of so-called crystal (xtal) offset tuning, digital frequency offset compensation, synthesizer programming, between the master and slave nodes in order to ensure that the frequency switch does not result in a frequency offset step that is large enough to cause loss of lock in frequency lock loops.

Further, transmission TX output power compensation can be performed upon switching frequency or frequency band, in order to ensure that any regional regulatory limits are not exceeded.

As a further option, different slots can be assigned. As an example, a type A, fixed slot is used for data (audio, video, computer data), whereas a type B, free slot is used for retransmissions, control or sniffing, or is kept idle if not needed, as described, e.g., in the International patent publication WO 2005/099156. In a specific embodiment, the protocol has a fixed first single or multiple number of type A slots to guarantee a minimum throughput, and uses a fixed second single or multiple number of type B slots.

It will be appreciated to those skilled in the art having the benefit of this disclosure that this invention is believed to provide integrated circuit systems. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. An integrated circuit system for wireless data communication, comprising:
   a plurality of ports for connection to a plurality of radio frequency RF antennas;
   a radio module chain coupled to the plurality of ports for transmitting and receiving RF signals via the plurality of RF antennas, wherein each radio module within the radio module chain comprises mixers, at least one oscillator, at least one adder and at least one buffer;
   a first protocol module for executing at least a part of a first protocol
   a second protocol module for executing at least a part of a second, and
   a set of hardware components for performing wireless data communication, wherein at least a subset of the hardware components is shared by the first and second protocol modules for performing simultaneous wireless data communication based on the first protocol and the second protocol.

2. An integrated circuit system according to claim 1, wherein the subset of hardware components is shared using a time sharing interface.

3. An integrated circuit system according to claim 1, wherein the subset of hardware components is simultaneously shared using different operating frequencies.

4. An integrated circuit system according to claim 1, wherein the subset of shared hardware components includes at least one processor, at least one Digital Rights Management (DRM) engine and at least one I/O component.

5. An integrated circuit system according to claim 1, wherein the subset of shared hardware components includes at least one of the radio modules in the radio module chain.

6. An integrated circuit system according to claim 1, wherein the subset of shared hardware components includes a common processor for executing at least a part of the first protocol and at least a part of the second protocol.

7. An integrated circuit system according to claim 1, wherein the subset of hardware components is included on a single integrated circuit.

8. An integrated circuit system according to claim 1, further comprising a processor that is loaded with software for executing at least a part of the first protocol and at least a part of the second protocol.

9. An integrated circuit system according to claim 1, further comprising a hardware component that is adapted to assign any of the subset of shared hardware components to the first protocol or the second protocol 10. An integrated circuit system according to claim 1, wherein the first protocol includes a Wi-Fi standard.

11. An integrated circuit system according to claim 1, wherein the second protocol includes a dedicated protocol for wireless audio communication.

12. An integrated circuit system according to claim 1, wherein the subset of shared hardware components includes the entire radio module chain.

13. An integrated circuit system according to claim 1, wherein the radio module chain includes a first oscillator, a second oscillator, a first phase shift circuit, a second phase shift circuit, a multiple number of mixers, a first adder, a second adder, and a multiple number of buffers, wherein the buffers are mutually connected so as to form the radio module chain as a multiple input multiple output (MIMO) radio structure.

* * * * *